Jan 6, 1931.    L. W. WATERS    1,787,648
CENTRIFUGAL GOVERNOR
Filed July 23, 1928
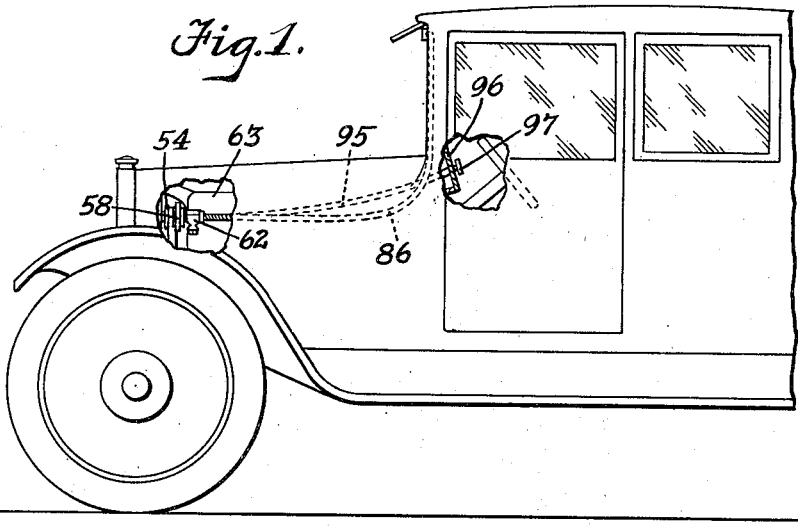
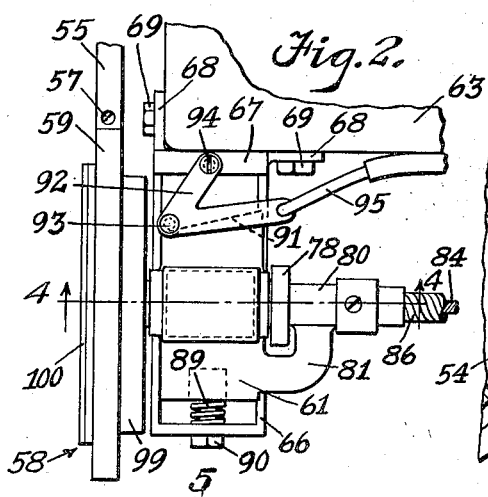
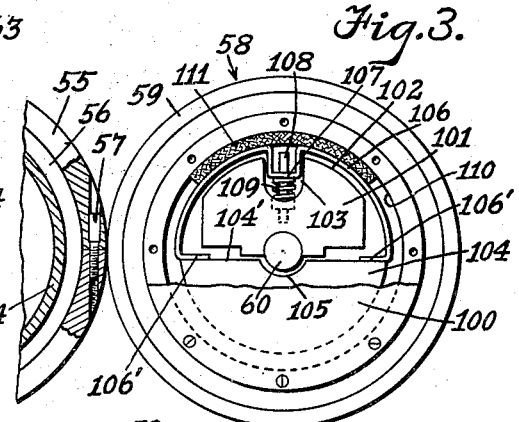
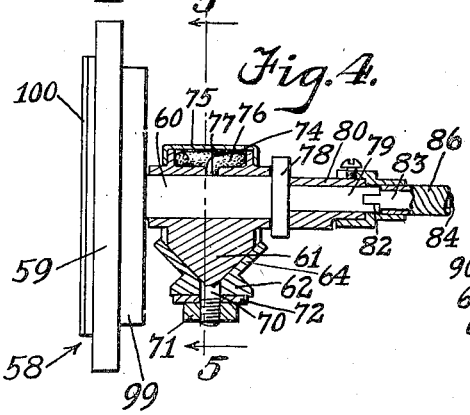
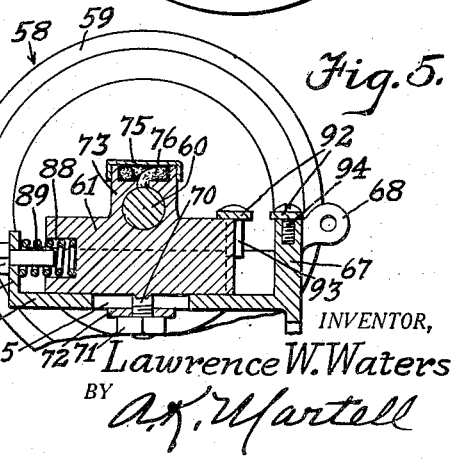
INVENTOR,
Lawrence W. Waters
BY
A. K. Martell
ATTORNEY.

Patented Jan. 6, 1931

1,787,648

UNITED STATES PATENT OFFICE

LAWRENCE W. WATERS, OF LOS ANGELES, CALIFORNIA

CENTRIFUGAL GOVERNOR

Application filed July 23, 1928. Serial No. 294,825.

My invention relates to automobile accessories and has particular reference to a centrifugal governor for a mechanical wiper for windshields on automobiles.

The general object of the invention is to provide a governor of improved construction, particularly useful for limiting the speed of an automobile wiper when the engine of the automobile, which drives the wiper, is working at a high speed.

A practical embodiment of my invention is illustrated in the drawings which accompany this specification and form a part thereof and in which, Fig. 1 is a left side view of the front end of an automobile which is equipped with my windshield wiper, part of the engine housing and of one door thereof being shown broken away to disclose the arrangement of the driving and control mechanism.

Fig. 2 is an enlarged plan view of the driving mechanism shown in Fig. 1.

Fig. 3 is a front view of the driving mechanism shown in Fig. 2, part of the covering plate of the friction wheel being shown broken away to disclose the inner parts thereof.

Fig. 4 is a sectional view of the friction wheel bearings shown in Fig. 2, the section being taken on line 4—4 of that figure.

Fig. 5 is a sectional view of the same bearings, taken at right angles to the view shown in Fig. 4, on line 5—5 of that figure.

The power for operating the windshield wiper is taken from the pulley 54 of the usual cooling fan associated with the engine of the automobile as illustrated in Fig. 1. A two-piece ring 55 is clamped on the rim 56 of the fan pulley, by means of screws 57, to serve as a friction drive wheel. A friction take-off wheel 58 having a rubber rim 59 adapted to make frictional contact with ring 55, is mounted on the front end of a stub shaft 60, which is journaled in a movable bearing block 61, said bearing block being supported by a guide bracket 62 which is attached to the engine head 63, adjacent the fan pulley, in such a manner that the axis of stub shaft 60 is maintained in parallel relation to that of the fan pulley and rim 59 of friction wheel 58 is maintained in the same vertical plane with friction ring 55.

Bracket 62 is provided with a V-shaped trough 64 extending in transverse relation to shaft 60, said trough having a longitudinal slot 65 in the bottom thereof and having its ends closed by walls 66 and 67. Lugs 68 adapted to receive fastening screws 69 by which it is secured to the engine head are formed on one end of bracket 62.

Bearing block 61 is made somewhat shorter than trough 64 and its under side is shaped to conform thereto so that as it rests therein, it readily may be shifted toward one or the other end thereof. It is retained in the bracket trough by a pin 70 fixed in its under side so as to project through slot 65, said pin being screw-threaded and a nut 71 with a washer 72 thereunder being screwed on its projecting end. The journal box 73, in which stub shaft 60 turns, is formed in the upper part of bearing block 61 and is provided with an oil chamber 74 equipped with a cap 75. The oil is supplied, preferably, by means of a saturated wick 76 which is coiled in the oil chamber with one end inserted in the oil hole 77.

A collar 78 is fixed on the rear end of stub shaft 60 which is provided with a reduced extension 79 turning in a tubular bearing 80 which is supported by a lateral arm 81 made integral with bearing block 61. The end of shaft extension 79 is provided with a transverse notch 82 adapting it to make connection with one end piece 83 of a flexible shaft 84, which extends rearwardly and upwardly to a windshield wiper on an automobile to which wiper the shaft is suitably connected for operating the same.

The outer end of bearing block 61 is provided with a recess 88 in which one end of a compressed helical spring 89 is inserted, its other end butting against end walls 66 of bracket 62 and being held in place by a pin 90 projecting through end wall 66 into it. Spring 89 is thus adapted to actuate bearing block 61 toward the engine so as to hold friction wheel 58 in contact with ring 55. The opposite or inner end of bearing block 61 is cut obliquely from front to rear, as shown at 100

91, and a cam plate 92 with a pin 93 fixed therein so as to work against oblique end 91 and thus to shift bearing block 62 away from the engine, against the action of spring 89, is pivoted in end wall 67 as at 94. One end of a choke wire 95 which extends rearwardly and upwardly to the instrument board 96 of the automobile is pivoted in cam plate 92, its other end being brought out through the instrument board and having a knob 97 fixed thereon, which may be pushed or pulled to actuate said cam plate 92.

In order to limit the motion of my windshield wiper when the engine is working at high speed a governor device is provided in friction wheel 58 which is made with a large hollow hub 99, turnable on stub shaft 60, with its front side open and equipped with a removable cover plate 100. A segmental block 101, having an arcuate edge 102 whose radius is somewhat smaller than the internal radius of the hub and having a relatively wide and deep notch 103 cut in the middle of said arcuate edge, is secured to the end of stub shaft 60 within hub 99, the thickness of block 101 being appreciably less than the internal depth of the hub so that the latter may turn freely about the former.

A semicircular block 104, of the same thickness as segmental block 101, but having a somewhat larger radius, is placed loosely in hub 99 diametrically opposite segmental block 101, a semicircular notch 105 being cut out of the straight edge thereof to provide clearance between it and stub shaft 60. A semicircular rim 106, of stiff band metal, is placed around segmental block 101 and its ends 106' are fastened to the straight edge 104' of semicircular block 104, its middle portion being bent to form an offset section 107 in notch 103 of segmental block 101. A radial pin 108, projecting outwardly from the middle of notch 103 and through offset section 107 of rim 106, is fixed in segmental block 101 and a compressed helical spring 109 is slipped on said pin between offset section 107 and block 101, said spring being thus adapted to press rim 106 toward the inner surface 110 of the hub and to hold semicircular block 104 as near as possible to the center of the hub. A piece of brake lining 111 or other suitable material is attached to the convex side of rim 106 at the middle portion thereof to provide an effective frictional contact surface.

The operation of my windshield wiper will be seen to be quite simple. Normally knob 97 is left in its pulled out position, which means that cam plate 92 is turned from the position shown in Fig. 2 so far as to swing cam pin 93 to the other side of bracket trough 64. Bearing block 61 is then forced outwardly from the engine and friction wheel 58 is held out of contact with rim 55. When the wiper is to be set going, knob 97 is pushed in, as shown in Fig. 1, which causes the cam to turn into the position shown in Fig. 2, thus permitting spring 89 to shift bearing block 61 toward the engine so as to bring friction wheel 58 in contact with ring 55. Wheel 58 being thus caused to turn causes stub shaft 60 to turn with it, so long as the friction between inner hub surface 110 and brake lining 111 on rim 106 is sufficient. When, however, the speed of friction wheel 58 exceeds a predetermined rate, centrifugal force acting on semicircular block 104 produces a pull on rim 106 diametrically opposite to the action of spring 109. The effect of this counteracting pull on spring 109 is to lessen the friction between hub surface 110 and brake lining 111 and thus to permit a certain amount of slip therebetween which reduces the speed of shaft 60, and the wiper parts driven thereby.

While I have shown the friction drive mechanism in connection with the fan pulley, obviously this may be made to run from the transmission instead.

Having thus illustrated and described my invention I claim:

In combination, a shaft, a friction wheel formed with a hollow hub and turnably mounted on said shaft, a fixed block provided with a notch and fixed on said shaft within said hub, a movable block within said hub, a rim secured to said movable block and surrounding said fixed block, an offset formed in said rim and loosely fitted in said notch in said fixed block, a brake lining secured to the outer side of said rim, and a spring in said notch between the inner end of the notch and said offset for normally maintaining said brake lining in contact with the inner surface of said hub.

LAWRENCE W. WATERS.